INVENTOR:
STEPHEN W. DERBYSHIRE

BY Parrott, Bell, Seltzer, Park & Heard
ATTORNEYS

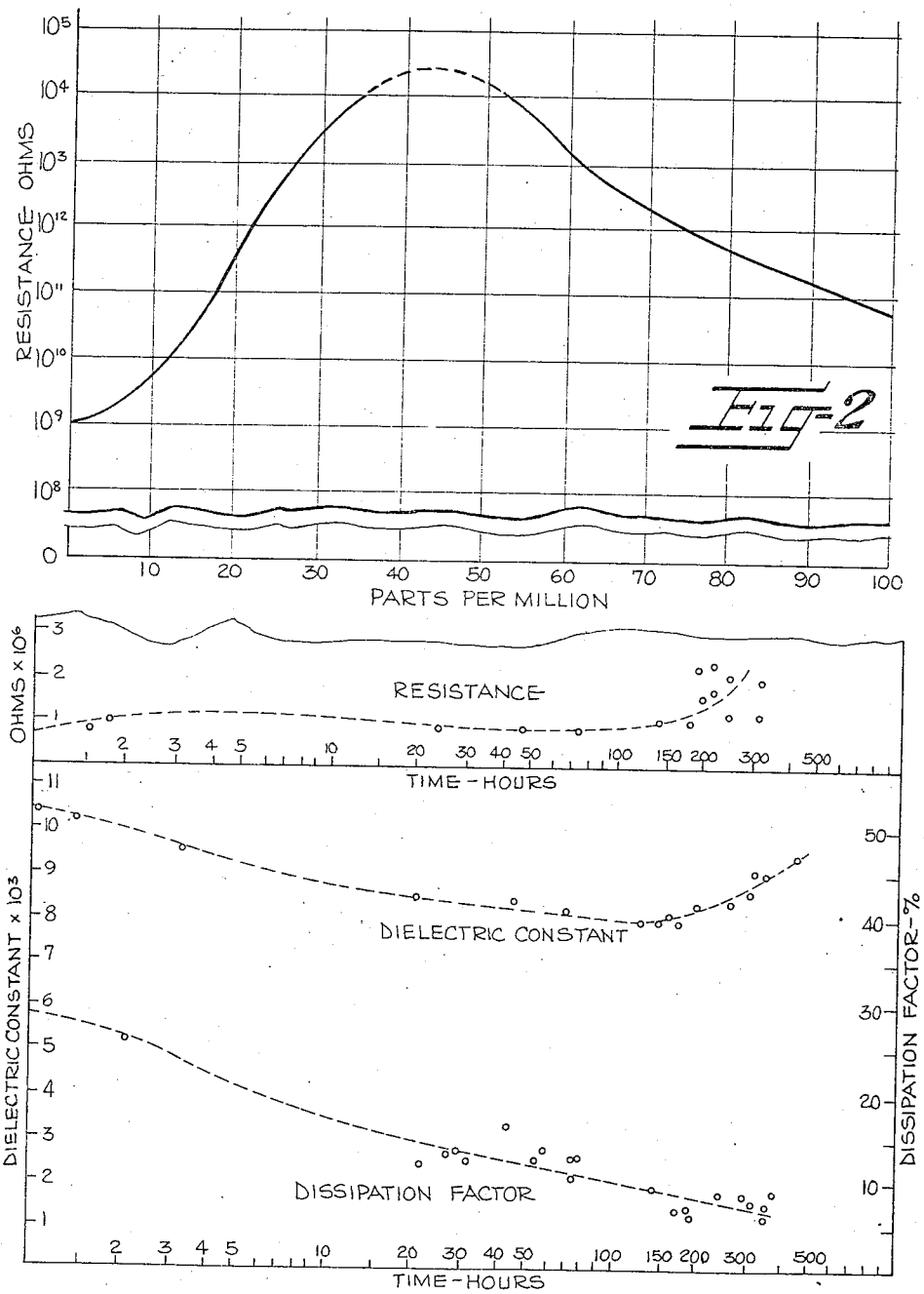

3,472,776
ELECTRICALLY STABILIZED FERROELECTRIC COMPOSITIONS OF PEROVSKITE LATTICE STRUCTURE (BaTiO₃ PLUS Mn IMPURITIES) AND METHOD OF MAKING THE SAME
Stephen W. Derbyshire, Raleigh, N.C., assignor to Charlotte Chemical Laboratories, Inc., Charlotte, N.C., a corporation of North Carolina
Continuation-in-part of application Ser. No. 215,881, Aug. 9, 1962. This application Sept. 15, 1965, Ser. No. 491,854
Int. Cl. C04b 35/46
U.S. Cl. 252—62.9                                    6 Claims

ABSTRACT OF THE DISCLOSURE

An improved coprecipitation method of making crystalline ferroelectric compositions having perovskite lattice structures whereby the degradation of the electrical properties of the compositions is retarded, and the composition produced in accordance with the improved coprecipitation method.

---

This application is a continuation-in-part of a copending application, Ser. No. 215,881, filed Aug. 9, 1962.

The present invention relates to electrically stabilized crystalline ferroelectric compositions having perovskite lattice structures and a method of making such compositions. An electrically stabilized composition, in the present context, is one in which the degradation of the electrical properties of the composition is retarded.

As is generally know, crystalline ferroelectric compositions may be divided into two broad categories: a first type having a single axis of polarization, and a second type having three equivalent axes any of which may be an axis of polarization. Most compositions of the second type have a lattice structure of the perovskite unit lattice, which may be physically characterized as two inter-penetrating simple cubic lattices: one of cations having a relatively large ionic radius, and the other of cations having the necessary size and oxidation state or coordination number to exist in an oxygen octahedron. Oxygen ions are to be found at the interstices of the above two inter-penetrating simple cubic systems. The resultant quasi-cubic unit lattice, herein referred to as a perovskite unit lattice, has eight vertex positions occupied by the cations of relatively large ionic radius; a body centered position occupied by the smaller cations, usually of a transition element; and six interstitial, face centered positions occupied by oxygen ions. The unit lattice is the elemental "building block" of the perovskite lattice structure.

Many generally known compositions having a perovskite lattice structure have been broadly characterized chemically by the general formula $ABO_3$. One such composition, which has been widely used an studied, is barium titanate, in which the constituent A is barium and the constituent B is titanium. In barium titanate perovskite lattice structures, barium ions occupy the vertex positions, titanium ions occupy the body centered positions, and oxygen ions occupy the interstitial face centered positions of the unit lattices of the lattice structure.

Due to the favorable electrical characteristics of compositions of the second type described, when "spontaneously polarized" in a ferroelectric form, and particularly the relatively high dielectric constants obtainable, the compositions find commercial uses as dielectric materials, as in capacitors, and as piezoelectric materials, as in transducers. Ordinary solid materials have dielectric constants in the range of 20 or less, while high purity perovskite lattice structure ferroelectric compositions have been known to have dielectric constants ranging into the thousands and commercially produced perovskite lattice structure ferroelectric compositions, having a relatively high degree of contaminants and/or impurities therein, commonly have dielectric constants in the range of 500 to 1,500, and may have higher dielectric constants when subjected to special treatment. Such higher values are obtained, however, at substantial sacrifice of other characteristics, specifically resistivity and dissipation factor. Commercially useful devices are generally manufactured by producing the compositions as a powdered crystalline material, forming the material by pressing into a preferred configuration, and sintering the powdered material into a ceramic with the preferred configuration.

While devices using ferroelectric compositions of the type described have highly advantageous characteristics, and would be preferred over other dielectric materials for many uses, a major deficiency which has reduced the commercial attractiveness of devices using such compositions is the phenomenon of electrical degradation or aging. Aging may be defined as the degradation of the electrical characteristics of the ferroelectric composition with the passage of time, and is particularly noted as a decline in dielectric constant, which reduces the capacity of a device using the material, as measured in farads.

It has been determined that a perovskite lattice structure when produced as a powdered crystalline material by calcining organic compounds at temperatures below 800° C. will have a cubic crystalline form at room temperature and, in this form, is paraelectric, i.e., has no inherent axis of polarization but is capable of polarizing along any one of the three crystalline axes when subjected to an applied electric field. When subjected to temperatures of 800° C. to 900° C. or above, as in the aforementioned sintering operation wherein temperatures on the order of 1300° C. are usually employed, the perovskite lattice structure changes to a tetragonal crystalline form, which transition is believed to be due to the thermal removal of oxygen ions from certain of the interstitial face centered positions or lattice sites. Simultaneously, the lattice structure becomes ferroelectric; i.e., exhibits "spontaneous" polarization along one of the three equivalent crystal axes.

Upon thermal removal of these oxygen ions, at least one and probably two electrons remain in the vacated face centered lattice sites (as manifested by the creation of F color centers, which are defined as vacant lattice sites occupied by electrons which absorb energy in the visible frequency range). When the ferroelectric perovskite lattice structure is placed in an oxygen containing atmosphere, oxygen from the atmosphere has a tendency to and will, after a period of time, ionize and re-occupy the vacant face centered sites in the perovskite lattice structure. It is believed that the tendency of atmospheric oxygen to re-occupy the vacant face centered sites in the perovskite lattice structure is materially strengthened and the time for re-occupation thereby is substantially shortened by the presence of the electrons remaining in the vacant face centered sites.

Upon re-occupation of the vacant face centered sites by oxygen ions, the perovskite lattice structure reverts to a cubic crystalline form and becomes paraelectric with a marked increase in resistance and substantial decrease in dielectric constant. In other words, electrical aging has occurred.

High purity perovskite lattice structure compositions are particularly subject to this electrical aging after only a short time period. In fact, this time period has heretofore been so short that such high purity compositions have not been commercially practicable. The commercially produced perovskite lattice structure ferroelectric compositions have a greater resistance to electrical aging than the high purity perovskite lattice structure ferroelectric compositions, which is believed to be due to the contained contaminants and/or impurities which impede to some extent the re-entry of oxygen ions into the vacant sites, and therefore have a somewhat longer effective life. However, devices made with these commercially produced compositions still have a very short effective life which renders their use expensive and frequent replacement time consuming and laborious.

More importantly, such commercially produced perovskite lattice structure ferroelectric compositions have markedly inferior electrical characteristics as compared with the high purity perovskite lattice structure ferroelectric composition. These inferior electrical characteristics often result from the existence of a two-phase system, in which at least portions of the lattice structure are other than perovskite.

It has been determined that electrical aging may be retarded by delaying the transition of the perovskite lattice structure from tetragonal to cubic crystalline form, and that the transition may be delayed or eliminated by preventing the re-occupation of vacant oxygen lattice sites by oxygen ions. In order to at least delay such reoccupation, the present invention contemplates the replacement of B constituent ions, in at least some of the perovskite unit lattices, by ions of an element capable of having a plurality of stable oxidation states while maintaining an ionic radius satisfactory to maintain the perovskite unit lattice. The replacement ions are present throughout the total lattice structure of the ferroelectric composition in numbers of the order of magnitude of the relative number of oxygen vacancies occurring upon transition to the ferroelectric tetragonal form. Such replacement ions are believed to delay or prevent the reoccupancy of the vacant oxygen lattice sites by removing electrons from F color centers at those sites, and thereby materially retard the aging phenomenon.

Accordingly, it is an object of the present invention to stabilize the electrical aging characteristics of ferroelectric compositions of the perovskite lattice structure type by incorporating, in the lattice structure, ions capable of having a plurality of stable oxidation states while maintaining the ionic radius required for maintaining a perovskite unit lattice.

Another object of the present invention is to provide a method of making electrically stabilized ferroelectric compositions of the perovskite lattice structure type in which ions required for the lattice structure are co-precipitated into the approximate relative physical positions required for the lattice structure and include ions capable of having a plurality of oxidation states while occupying predetermined positions in the unit lattice.

Some of the objects of the invention having been stated, other objects will appear as the description proceeds when taken in connection with the accompanying drawings, in which:

FIGURE 2 is a graph of the effect on one electrical characteristic of a replacement ion in a high purity composition;

FIGURE 3 is a graph of experimentally measured electrical characteristics, similar to FIGURE 1, of a ferroelectric composition incorporating a replacement ion in accordance with this invention.

Figure 1:
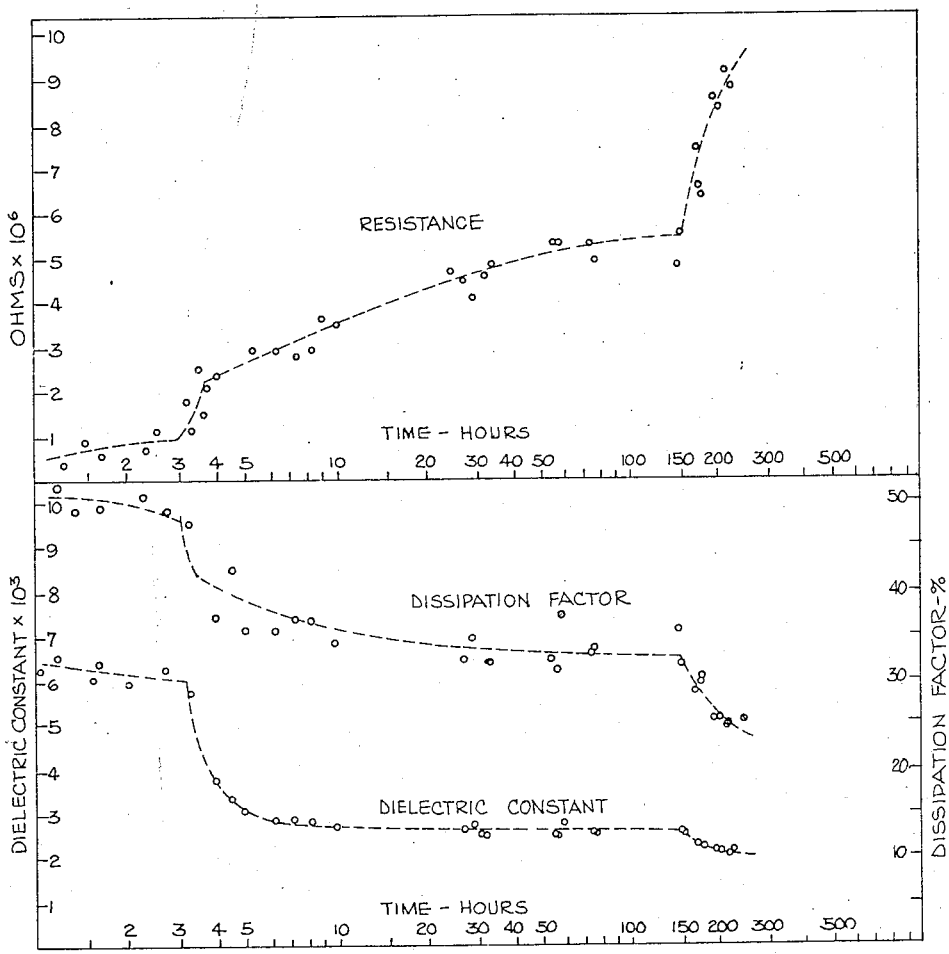
FIGURE 1 is a graph of experimentally measured electrical characteristics of a high purity perovskite lattice structure ferroelectric composition.

As stated briefly above, many perovskite lattice structure compositions are chemically characterized by the general formula $ABO_3$, and barium titanate is one such composition in which constituent A is barium and constituent B is titanium. As barium titanate has been a widely used and studied composition of the pervoskite lattice structure type, the present invention will be described with frequent reference to barium titanate, but it is to be understood that this invention contemplates any perovskite lattice structure composition, in which the constituents A and B may be at least partially other than barium and titanium.

More particularly, it is not necessary that the constituents A and B of a perovskite lattice structure composition be of consistently the same element throughout all of the unit lattices of the composition. The lattice structure will accommodate a variety of different ions, without becoming a two-phase system (i.e., including unit lattices which are other than perovskite), so long as the oxidation state and ionic size of each ion is proper for a perovskite unit lattice including that ion to exist. Varying mole portions of the barium ions at the vertex positions or lattice sites of a barium titanate composition may be replaced by strontium, calcium, magnesium or lead, without causing such distortion of the composition lattice structure so as to cause the unit lattices to become other than perovskite. Further, varying mole portions of titanium ions may be replaced at the body centered lattice sites by zirconium and hafnium, without causing such distortion. Typically, certain minor portions, less than one hundred parts per million, of such ions will be present in any high purity perovskite lattice structure composition such as barium titanate, and the intentional addition of such ions within the equivalent mole portion ranges may be considered desirable in certain instances in order to obtain particular characteristics imparted by those minor constituents, such as a variation in characteristics near the Curie and other transition temperatures.

Further, perovskite lattice structures will occur where the oxidation states of the vertex ions and body-centered ions, or constituents A and B respectively, are $+1$ and $+5$ or $+3$ and $+3$ respectively, rather than the more widely studied $+2$ and $+4$ compositions such as barium titanate. One example of a perovskite lattice structure composition having A and B constituents in the $+1$ and $+5$ oxidation states is potassium niobate ($KNbO_3$).

Chemical stability of a perovskite lattice structure composition typically requires that the A and B constituents be present in a mole ratio ($A/B$) less unity. Perovskite lattice structures may occur with an $A/B$ ratio in the range of from about 0.98 to about 1.02 (that is, no crystallographic differences are observable within this range), and the most favorable electrical characteristics are found at a ratio of unity. However, for the most favorable chemical stability and satisfactory electrical characteristics, it is preferred to have an $A/B$ ratio less than but closely approaching unity, such as 0.99. An excess of the constituent A, when that constituent is an alkaline earth metal, results in a reaction with the atmosphere producing hydroxides and carbonates which are extremely detrimental to the electrical characteristics of the composition.

High purity barium titanate has been produced by co-precipitating chlorides of barium and titanium in oxalic acid, with the oxalate being calcined at 700° C. or below. The powdered barium titanate thus produced is formed by pressing and sintered to produce a useful device. Such a method of production has the advantages of permitting the production of powdered barium titanate with particle sizes in the sub-micron range, which have been shown to provide the highest possible dielectric constants and most favorable electrical characteristics by reducing the crystallite size in the sintered ceramic. Further, by careful quantitative and purity control of the chlorides used during the high purity production process, reproducibility of electrical characteristics from batch to batch is obtained and the number of variables requiring control during production is reduced.

Barium titanate is usually produced in commercial quantities by calcining powdered materials in a kiln which is a variation of a cement kiln. More particularly, powdered barium carbonate and rutile are agitated and calcined to produce a barium titanate powder. Particle size of the powder is uncontrollable during this commercial manufacturing process, and significant impurity content is invariably introduced by contamination from the refractory walls of the kiln, which contain silicon. Due to the entirely unpredictable contamination effect which is inherent upon reliance upon mixing of powdered materials in a rotary kiln, electrical characteristics cannot be reproduced from batch to batch, and each batch must be individually tested to determine its characteristics.

As stated above, experimental studies, by X-ray diffraction, of high purity perovskite lattice structure compositions, produced in accordance with the barium titanate method described above and containing less than one hundred parts per million of impurities, have shown that the perovskite lattice structure is in a cubic crystalline form at room temperatures. Upon heating or re-heating to temperatures from 800° C. to 900° C. or above, the perovskite lattice structure readjusts into a tetragonal crystalline form which is ferroelectric, and it is in the tetragonal form that such compositions are commercially useful. Temperatures in excess of 1300° C. are reached during the sintering process by which useful configurations are produced, and the tetragonal crystalline form is thereby attained.

Fundamental thermodynamic considerations, and in particular the Helmoltz free energy function and Boltzmann's relation, demand that at any given temperature above absolute zero there must be an equilibrium number of lattice vacancies in any crystalline solid. Due to these fundamental considerations, a certain number of the lattice sites which would be occupied at a certain temperature by ions of a constituent element of the crystalline solid composition will be vacated as the temperature is raised. The higher the temperature reached, the greater the number of vacant lattice sites for an equilibrium condition to exist. It is believed that heating of perovskite lattice structure compositions to sintering temperatures brings about the thermal removal of oxygen ions from the lattice structures of the composition. Oxygen vacancies are the most likely to occur as oxygen has the highest vapor pressure of any of the ions present in the lattice structure. Such vacant lattice sites introduce a degree of disorder in the lattice structure of the composition, resulting in a change in crystalline form to that which will have a minimum of free energy for that particular lattice structure and environmental condition if sufficient time is allowed for thermal equilibrium to obtain.

Additional variations in the characteristics of perovskite lattice structure compositions have been observed which support the indication of thermal removal of oxygen ions. When an oxygen ion is thermally driven from its original lattice site to the surface of the composition solid and removed, creating a vacant oxygen lattice site or Schottky defect, it loses the electrons necessary for ionization and positioning within the perovskite lattice structure, and becomes atomic oxygen. The electrons occupy the original lattice site, produce an F color center, and are in the conduction band of the composition solid causing the solid to be an n-type semi-conductor. The presence of F color centers, which are indicative of electrons occupying vacant oxygen lattice sites, is readily apparent from the progressive variation in color of the composition as heating progresses, from a light yellow toward a dark blue color. Further, change in gravimetrically determined weight, electrical conductivity, dissipation factor, and dielectric constant have been observed under varying environmental conditions, and are all apparently caused by changes in the quantity of oxygen contained in the composition.

As stated above, upon heating in a normal ambient atmosphere to temperatures in excess of 900° C., such as the 1300° C. temperature reached during the sintering process, the perovskite lattice structure undergoes a transition from a cubic form into a tetragonal form and the composition becomes ferroelectric. The tetragonal crystalline form is retained upon cooling to room temperatures, and this retention of the tetragonal form is the cause of the commercial usefulness of perovskite lattice structure ferroelectric compositions.

It has been noted that the enumerated changes in characteristics of a perovskite lattice structure composition are reversible in the presence of oxygen, with the rate of reversion being dependent upon environmental conditions. These changes, including a reversion from a tetragonal crystalline form to a cubic crystalline form, proceed most quickly at temperatures slightly above normal and/or in environments where relatively large amounts of oxygen or water vapor are available, and most slowly at lower temperatures and/or in oxygen free or oxygen limited environments.

FIGURE 1 is a graph of plotted experimental measurements indicating the changes in certain characteristics, taken from a sample of a high purity perovskite lattice structure composition. From a study of the plotted measurements, it is seen that discontinuities in the rates of change of characteristics occur at particular time intervals. Generally, resistance rises and dissipation factor and dielectric constant fall at low rates of change during an initial time period. The rates of change increase markedly at the occurrence of a first discontinuity and thereafter return to a lower rate of change. At approximately 150 hours after the experiment was begun, the rates of change of resistance, dissipation factor and dielectric constant are increased markedly again. The marked increases of discontinuities in rates of change, which are characteristic of electrical aging, are considered to have occurred due to re-entrance of oxygen into the composition and re-occupation of vacant oxygen lattice sites throughout the lattice structure of the composition. The observed discontinuities are possibly the result of a major change in crystalline form of the lattice structure. It may be noted that the values for dielectric constant shown in FIGURE 1 are higher than those previously indicated as conventionally available for commercially produced barium titanates. The conclusions to be drawn from the experimental measurements graphically illustrated in FIGURE 1 are that high-purity compositions provide highly favorable electrical characteristics, which would be greatly advantageous to commercial use, but are subject to rapid aging loss of such characteristics.

The changes in electrical characteristics illustrated graphically in FIGURE 1 are typical of electrical aging, and in this instance, were observed to accompany a reversion of the perovskite lattice structure of the composition from a tetragonal crystalline form to a cubic crystalline form. Similar variations in observed characteristics, such as those illustrated in FIGURE 1 for a high purity composition, have been found in commercially produced barium titanate, although the changes proceed at a slower rate.

In conducting the experiment from which the measurements plotted graphically in FIGURE 1 were taken, a sample of barium titanate was prepared, by calcining co-precipitated oxalates at a temperature of 700° C. to have total impurities of less than one hundred parts per million, present as strontium, iron, silicon and aluminum, and without addition of other ions. The powdered barium titanate thus prepared was sintered in an argon atmosphere and kept in argon until the experiment was begun. An initial period of approximately three hours after removal from the oxygen free atmosphere was required for the application and drying of silver electrodes.

In order to provide compositions of the type described above and having the advantages of high purity compositions and which are electrically stabilized as compared to known commercial products, the present invention contemplates the reduction of the rate at which oxygen re-enters the perovskite lattice structure and re-occupies the vacant oxygen lattice sites occurring upon transition into a tetragonal crystalline form. This is accomplished by removing electrons from F color centers at vacant oxygen lattice sites, so as to enable the composition to maintain electrical neutrality, and thereby preventing or at least substantially delaying the re-occupation of the vacant oxygen lattice sites. These electrons are removed by replacing, at at least some of the lattice sites, the B constituent ions at such lattice sites with ions capable of having a plurality of relatively stable oxidation states while maintaining the ionic size necessary for the continuance of a perovskite unit lattice, with the replacement ions being present in numbers sufficient to accept the number of electrons present in the vacant oxygen lattice sites upon thermal removal of sufficient oxygen ions to cause the crystalline form transition. Elements which are satisfactory for use as replacement ions will have an ionic radius or size approximating that of the B constituent ion when in the oxidation state that the B constituent ion has in a perovskite unit lattice. Additionally, the replacement ion will have a very small change in the optimal ionic radius or size with the change in oxidation state required for the acceptance of electrons. In the instance of barium titanate, a replacement ion will have an ionic radius approximating that of titanium, or 0.68 angstrom, when in a +4 oxidation state. Such replacement ions, when present in small quantities and occupying lattice sites otherwise occupied by B constituent ions, do not cause the unit lattices of the composition to become other than perovskite. Further, the replacement ions do not cause a significant sacrifice of the electrical characteristics obtainable in high purity compositions, when present in portions within the range of one to one hundred parts per million of the composition. Numbers of replacement ions within this range are sufficient to accept electrons in accordance with the statement above.

As the removal of oxygen ions from the perovskite lattice structure is attributed to an increase in the temperature of the composition, as in sintering, and thus the occupancy of vacant oxygen lattice sites by electrons to be removed is a function of temperature, the laws of statistical mechanics and thermodynamics are used to calculate the relative number of oxygen lattice site vacancies under a given set of environmental conditions. The number of vacant oxygen lattice sites from which electrons are to be removed is indicative of the order of magnitude of numbers of replacement ions to be used in accordance with the present invention.

In calculating the proportions of the replacement ions, recourse is made to the Helmholtz free energy function F which may be stated as:

$$dF = dE - TdS \geq 0$$

for constant volume and temperature (T). Here E represents the energy of the system and the total entropy (S) is represented as the sum of the thermal and configurational entropies; i.e., $$S = S_{th} + S_{cf}$$

The configurational entropy at constant temperature, which is an index to the degree of lattice structure disorder, is determined solely by the number of ways ($W_{cf}$) in which the ions and vacancies may be arranged over the total number of lattice sites. Thus:

$$W_{cf} = \frac{(N+n)!}{N!n!}$$

where

N = total number of lattice sites under consideration.
n = number of vacancies in the lattice structure.

Boltzmann's relation gives the entropy associated with $W_{cf}$ as:

$$S_{cf} = k \log W_{cf}$$

Thus, $$S_{cf} = k \log \frac{(N+n)!}{N!n!}$$

This expression accounts for the existence of vacant lattice sites at any temperature above absolute zero. When an ion is transferred from the interior to the surface of the crystal, the energy E increases with a resultant increase in the free energy F. This condition is thermodynamically unfavorable; however, at the same time the increase in vacancies increases the disorder in the crystal, thus increasing the configurational entropy at any given temperature. Since entropy enters the free energy equation negatively (−TS), an increase in entropy at some temperature T reduces the free energy F and is thus thermodynamically favorable. At some value of the ratio of vacancies to the number of lattice sites ($n/N$), the total energies ($E - TS$) will be a minimum and the crystalline solid will be at thermodynamic equilibrium.

It can be shown that, for a sample of a high purity barium titanate crystal heated from a temperature of 25° C. to a temperature of 1350° C. in an inert atmosphere, the relative number of oxygen vacancies (or the number of additional vacancies created by the temperature rise) should be on the order of $10^{17}$ per gram mole so that $$\frac{n}{N} \cong \frac{50 \times 10^{17}}{6.20 \times 10^{23}} \cong 9 \times 10^{-6}$$

or the relative number of vacancies to lattice sites is in the range of nine parts per million. These calculations have been substantiated by gravimetric experiments performed with high purity perovskite lattice structure compositions similar to that used for the experimental measurements illustrated in FIGURE 1.

Experimentation with electrically stabilized high purity perovskite lattice compositions, in which replacement ions within the range of one to one hundred parts per million of the composition are used in accordance with the present invention, has shown that electrical characteristics of the compositions will vary with the choice of a specific replacement ion and the relative quantity of replacement ions introduced. FIGURE 2 illustrates the variations in resistance observed as one specific replacement ion, namely manganese, is introduced into a high purity barium titanate composition otherwise similar to that used in obtaining the measurements illustrated in FIGURE 1. In making resistance measurements such as those plotted in FIGURE 2, resistance values in excess of $10^{14}$ ohms may not accurately and reliably be determined by a bridge type instrument. As such an instrument was used in conducting the experiment, measurements above that value are indicated by a dashed line. From the graph of FIGURE 2, it is seen that the most favorable effect is obtained within a specific range of parts per million, in that resistance values are at the highest or maximized. It is considered that maximization of resistance values is indicative of the most effective removal of electrons from vacant oxygen lattice sites, and thereby indicative of the greatest extension of the time required for re-occupation of those vacant oxygen lattices sites. Typically, high purity compositions incorporating replacement ions in accordance with the present invention will show electrical characteristics comparable to those of similar compositions not including the replacement ions, while the proportion of replacement ions is maintained near the peak of a curve similar to that shown in FIGURE 2. In any event, addition of quantities greater than those providing a peak resistance value will result in a sacrifice of all of the desirable electrical characteristics of a high purity composition by giving rise to a lattice structure which is not perovskite or by other effects not presently fully understood. As may be seen from the graph of FIGURE 2, manganese has a somewhat marked peak, provides a somewhat definite range within which improvement of the useful life of the composition occurs without deleterious effect on the electrical characteristics, and therefore is considered a preferred element for use as a replacement ion.

The effect of the use of replacement ions, in accordance with the present invention as heretofore set forth, is most immediately noticeable in the color changes upon heating of the composition. When a high purity perovskite lattice structure composition incorporating replacement ions in accordance with the present invention is heated to a sintering temperature, the transition in crystalline form noted above as occurring in a high purity composition not including replacement ions occurs. However, the color changes indicative of F color centers, or the presence of electrons in vacant oxygen lattice sites, proceeds more slowly and heating to approximately 1100° C. is required to display the effect observed at 900° C. in the high purity compositions not incorporating replacement ions. Inasmuch as the crystalline form transition is not affected, it is concluded that the marked change in color variation with temperature results from the removal of electrons from vacant oxygen lattice sites with the corresponding delaying or reduction in formation of F color centers.

Further, aging tests extending to four years duration have shown no significant electrical aging of high purity perovskite lattice structure compositions in accordance with this invention, and a retention of electrical characteristics superior to those of newly manufactured commercial products.

FIGURE 3 is a graph, similar to FIGURE 1, of plotted experimental measurements indicating the change in certain characteristics taken from a sample of a high purity perovskite lattice structure composition incorporating replacement ions in accordance with the present invention. From a study of the plotted measurements and a comparison of the graphs in FIGURES 1 and 3, it may be seen that the discontinuities in the plotted measurements of FIGURE 1 are not present in the plotted measurements of FIGURE 3. Further, the overall change of each of the measured values during the term of the experiment is substantially lessened. The conclusions to be drawn from the experimental measurements plotted in FIGURE 3 are that the favorable electrical characteristics of a high purity composition have been obtained, and that aging loss of such characteristics has been avoided.

In conducting the experiment from which the measurements plotted graphically in FIGURE 3 were taken, a sample of a high purity barium titanate incorporating 26 to 37 parts per million of manganese as the replacement ion was prepared by calcining co-precipitated oxalates at a temperature of 700° C. The powder thus prepared was sintered in argon atmosphere and kept in argon until the experiment was begun. An initial period of approximately three hours after removal from the oxygen free atmosphere was required for the application and drying of silver electrodes.

A preferred method for preparing electrically stabilized perovskite lattice structure compositions in accordance with the present invention is outlined in the following example, with particular reference to barium titanate. It has been found that the production of electrically stabilized barium titanate in this manner results in a product having favorable electrical characteristics and stable electrical properties.

EXAMPLE

Add 100 ml. of highly purified titanium tetrachloride ($TiCl_4$), drop by drop, to from 100 to 150 ml. of distilled water which is cooled in an ice bath. If the titanium tetrachloride is added slowly to the rapidly stirred distilled water, the resulting solution will be perfectly clear and free of hydrolyzed titanium. Dilute this solution with distilled water to 500 ml. and determine its titanium content. The exact titanium content must be known because the quantities of barium chloride and of oxalic acid to be used are based on this value.

Then, dissolve 165 g. (0.675 mole) of reagent grade barium chloride dihydrate ($BaCl_2 \cdot 2H_2O$) in 1600 ml. of distilled water and cool the solution to room temperature. Next, 1 g. (0.00507 mole) of reagent grade manganese chloride ($MnCl_2$) is dissolved in the barium chloride solution.

To this solution add the volume of the previously prepared titanium tetrachloride solution that contains exactly 32 g. (0.668 mole) of titanium. The barium and manganese chloride solution must be stirred constantly during the mixing and the temperature maintained at or below 30° C. to prevent hydrolysis of the titanium.

Dissolve 185 g. (1.47 moles) of oxalic acid dehydrate in 1,000 ml. of distilled water in a 4-liter beaker and heat the resulting solution in a steam bath to 80° C. Add the barium, titanium and manganese chloride solution slowly. A convenient way to do this is by means of a separatory funnel mounted above the beaker, as the rate of addition may be readily adjusted by means of the stopcock on the funnel. The oxalate solution must be stirred constantly during the addition of the solution containing barium, titanium and manganese chloride. It should be noted that the quantity of barium is 1 percent in excess and the quantity of oxalate is 10 percent in excess of the stoichiometric amounts required to produce $$BaTiO(C_2O_4)_2 \cdot 4H_2O$$

Also, the amount of manganese is much larger than the 26 to 37 parts per million which will be obtained in the calcined material. This is required due to the relative solubilities of the materials.

When the solution of barium, titanium and manganese chlorides first mixes with the solution of oxalic acid, a white flocculent precipitate forms which redissolves on stirring. The slow addition of the barium, titanium and manganese chloride solution is continued until a dense crystalline form of a complex salt having the general formula  $Ba[(Ti_{1-x}Mn_x)O](C_2O_4)_2 \cdot 4H_2O$ begins to precipitate. From two to four hours are required for the addition of the two liters of barium-titanium-manganese solution. At the end of the operation of mixing, the 4-liter beaker is removed from the steam bath and the clear supernatant liquid decanted through a filter paper on a Buchner funnel. The precipitate is then washed by decantation with distilled water five or six times, transferred to the Buchner funnel and again washed five or six times with distilled water. This precipitate will dry in the air and produce a fine dry granular salt free from lumps or cakes. The drying may be hastened by drawing clean air through the salt for three to four hours.

Thereafter, the salt is calcined at 700° C. or above to produce a powder free of organic material and having the composition $Ba(Ti_{1-x}Mn_x)O_3$. This powder is formed by pressing into a compact having a useful electrical shape and sintered at a temperature ranging between 1350° C. and 1390° C. The lower temperature is that used for thin cross sections such as used in capacitors; while the high temperature is used for thicker units such as heavy duty electromechanical transducers.

Upon destruction of the oxalate values, a perovskite lattice structure is obtained, in which barium ions occupy the vertex positions, a manganese or titanium ion occupies the body centered position, and oxygen ions occupy the face centered positions of a unit lattice. Unit lattices having a manganese ion as the body centered ion are present throughout the lattice structure on the order of 26 to 37 parts per million. In contrast to a high purity material which is properly characterized by the general formula $ABO_3$, the lattice structures of this invention which include a replacement ion may be more properly characterized by the general formula $AB_{1-x}C_xO_3$, wherein the A and B constituents are identical to those previously identified as suitable for occupying the vertex and body centered positions of a perovskite unit lattice, and the C constituent is the replacement ion. Thus, it is seen that the C element must have the properties enumerated above with respect to oxidation states and ionic radius as compared with the B element, and that "$x$" must have a value less than the weight percentage equivalent of 100 parts per million.

Other mixtures have been prepared in accordance with the general example and are reported in tabular form below. The manganese content as a replacement ion, in weight percentage in the various samples listed in Table I, varies between $2 \times 10^{-6}$ and approximately $70 \times 10^{-6}$, with the most stable material having about 40 parts per million weight percent of manganese present. The manganese determinations are the result of spectroscopic analyses with the limits indicating the uncertainty inherent in determining such small amounts of replacement ions without absolute standards for comparison.

Accelerated aging tests have been made on these materials at room temperatures and at temperatures ranging up to 700° C. For the data plotted in FIGURES 4, 5, and 6 pertaining to barium titanate samples having the specifications listed in Table I below, the experiments were conducted at room temperature and with a voltage gradient of 4 volts per mil over the test period.

TABLE I

| Sample No. | Replacement ion | Replacement ion, parts per million | Dielectric constant K | Dissipation factor, percent | A/B ratio |
|---|---|---|---|---|---|
| SINTERED IN ARGON | | | | | |
| 1 | Mn | 2.1–2.4 | 2,200 | 2.8 | .9963 |
| 2 | Mn | 8.6–9.8 | 7,000 | 4.9 | .9880 |
| 3 | Mn | 26–37 | 9,000 | 6.2 | .9871 |
| 4 | Mn | 64–68 | 15,000 | 55 | .9907 |
| SINTERED IN AIR | | | | | |
| 5 | Mn | 2.1–2.4 | 2,000 | 1.9 | .9963 |
| 6 | Mn | 8.6–9.8 | 2,050 | 2.2 | .9880 |
| 7 | Mn | 26–37 | 2,500 | 2.0 | .9871 |
| 8 | Mn | 64–68 | 2,400 | 2.0 | .9907 |
| SINTERED IN OXYGEN | | | | | |
| 9 | Mn | 2.1–2.4 | 2,300 | 1.55 | .9963 |
| 10 | Mn | 8.9–9.8 | 2,500 | 1.75 | .9880 |
| 11 | Mn | 26–27 | 2,500 | 1.55 | .9871 |
| 12 | Mn | 64–68 | 2,400 | 1.60 | .9907 |

Figure 4:
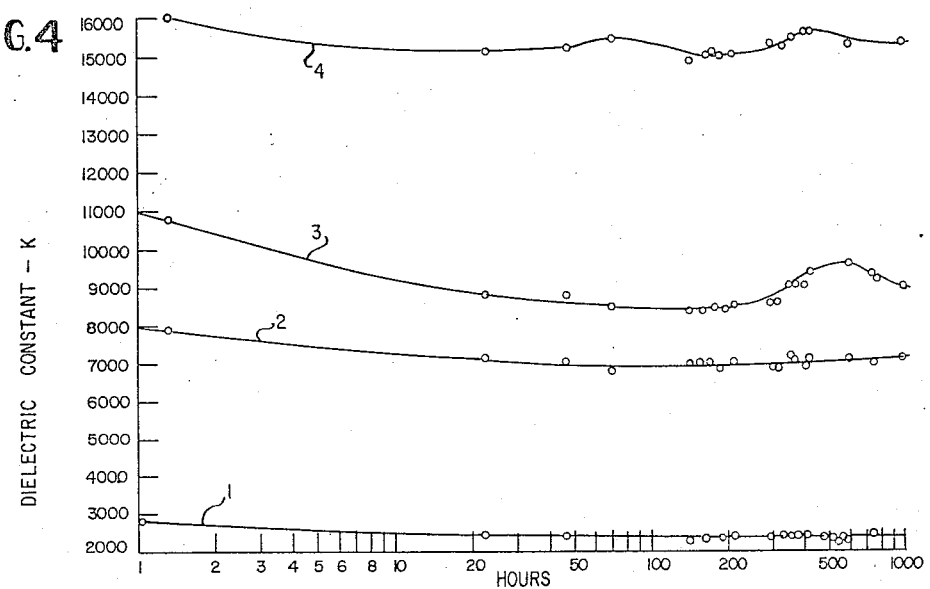
FIGURES 4, 5, and 6 are graphs of experimentally measured electrical characteristics of specific examples of compositions in accordance with this invention.
Figure 5:
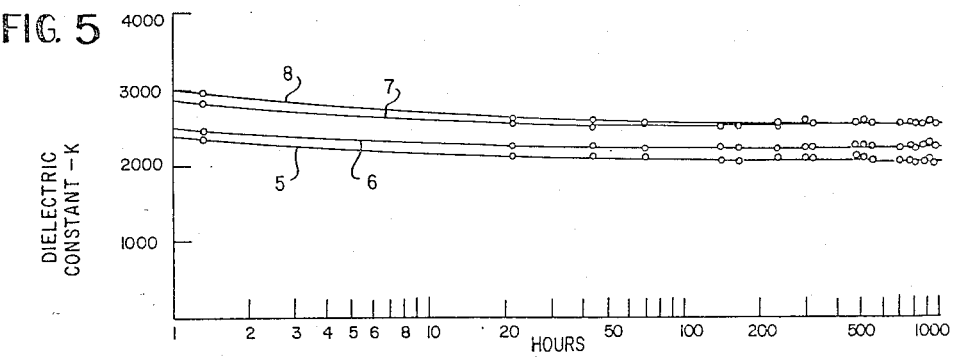
Figure 6:
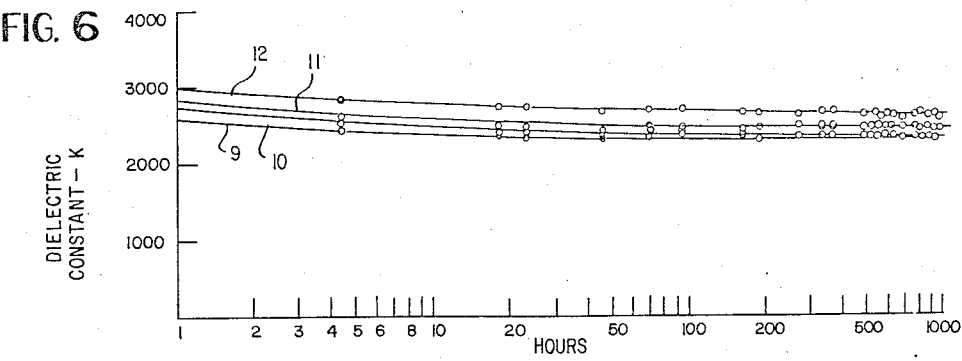

Referring to FIGURES 4, 5, and 6, it will be noted that as the oxygen partial pressure of the environment is increased, the dielectric constant shown over a period of 1,000 hours tends to approach lower limiting values; however, the percentage changes from the initial values are reduced and the net change after the first twenty-four hours is negligible.

Table I shows an effect of reduced oxygen partial pressures on the dissipation factor which limits the usefulness of compositions sintered in argon. Considering the dissipation factor, it would seem that sintering in oxygen would produce the most widely useful material; however, the sixty cycle hysteresis loops displayed by these materials indicate that the additional oxygen loss which occurs when sintering in a normal air atmosphere will provide the most stable material for ferroelectric purposes.

In summary, it is considered that the present invention has provided perovskite lattice structure compositions which have electrical characteristics superior to prior commercial products of a similar type and which are electrically stabilized in that they are not subject to the deficiency of electrical aging which has severely limited the use of such compositions. This is accomplished by materially retarding the re-occupation of vacant oxygen lattice sites resulting from thermal removal of oxygen ions, and thereby retarding the tendency for reversion of the lattice structure to a cubic crystalline form from a tetragonal form. Re-occupation by oxygen is retarded by removing electrons from the vacant oxygen lattice sites, which are necessary for ionization of atomic oxygen, and these electrons are removed by replacing a minute portion of the constituents of the composition with ions capable of having a plurality of stable oxidation states while maintaining an ionic size suitable for positioning in a perovskite unit lattice. This may be considered as the removal of electrons from the vacant lattice sites, which are in the conduction band of the solid composition, to the valence band of the replacement ions, where the electrons are not available for the conduction of electricity or re-ionization of elemental oxygen from the ambient atmosphere.

In the drawings and specification there have been set forth preferred embodiments of the invention and, although specific terms are employed, they are used in a generic and descriptive sense only and not for purposes of limitation, the scope of the invention being defined in the claims.

I claim:

1. In a coprecipitation method of producing a high purity barium titanate material wherein barium ions occupy vertex positions of unit lattices, titanium ions occupy body centered positions of unit lattices, and oxygen ions occupy face centered positions of unit lattices, which coprecipitation method includes reacting solutions of barium and titanium to precipitate a complex salt, filtering and drying the precipitate, and heating the precipitate to obtain a perovskite lattice structure, the improvement which comprises imparting to the material a characteristic of retarded electrical aging and including:

preceding the reaction of the solutions of barium and titanium with replacement of a minor portion of titanium ions with manganese ions capable of having a plurality of stable oxidation states in the lattice structure while maintaining an ionic radius approximately equal to that of titanium ions in the lattice structure, the minor portion being such as to yield material having manganese ions substituted for titanium ions in the body centered positions of some unit lattices and present in the range of from 1 to 100 parts per million by moles of the material, limiting the inclusion of impurity ions in the lattice structure to no more than 100 parts per million by moles of the material, including substituted manganese ions, maintaining titanium ions and substituted manganese ions in stoichiometric ratio excess over barium ions in the range of from about 1.02:1 to about 1:1, limiting the maximum temperature of the precipitate to 700° C. during heating thereof to obtain the lattice srueture, and thereafter driving some oxygen ions from the lattice structure by sintering in an oxidizing atmosphere at a temperature in the range of from about 900° C. to about 1390° C. and thereby liberating electrons from the oxygen ions to convert the same to atomic oxygen while capturing the liberated electrons by the manganese ions and continuing the sintering until a crystalline structure is obtained which is tetragonal and ferroelectric upon cooling to room temperature, whereby the affinity of the material for the reabsorption of oxygen ions into the lattice structure is reduced and electrical aging of the material is delayed.

2. The improved method according to claim 1 wherein the replacement of titanium ions is such that manganese ions in body centered positions are present in the range of 2.1 to 2.4 parts per millions by moles of the material.

3. The improved method according to claim 1 wherein the replacement of titanium ions is such that manganese ions in body centered positions are present in the range of 8.6 to 9.8 parts per million by moles of the material.

4. The improved method according to claim 1 wherein the replacement of titanium ions is such that manganese ions in body centered positions are present in the range of 26 to 37 parts per million by moles of the material.

5. The improved method according to claim 1 wherein the replacement of titanium ions is such that manganese ions in body centered positions are present in the range of 64 to 68 parts per million by moles of the material.

6. An electrically stabilized, oxygen octahedron group ferroelectric material produced in accordance with the method of claim 1 and having a dielectric constant of no less than about 2,000 and a dissipation factor of no more than about 2.2%.

References Cited

UNITED STATES PATENTS

| | | | |
|---|---|---|---|
| 2,685,524 | 8/1954 | Merker | 106—42 |
| 2,695,240 | 11/1954 | Oshry. | |
| 2,723,915 | 11/1955 | Merker | 106—42 |
| 2,860,998 | 11/1958 | Merker | 106—42 |
| 3,041,189 | 6/1962 | Herbert | 106—39 |

OTHER REFERENCES

Von Hippel, "Ferroelectricity, Domain Structure, and Phase Transitions of Barium Titanate," Reviews of Modern Physics, July 1950, pp. 232 and 235 relied upon.

Roth, "Classification of Perovskite and Other $ABO_3$-Type Compounds," J. Res. of Nat'l Bur. Stds., vol 58, February 1957, p. 78 relied upon.

Ceramics—A Symposium: pub. by Brit. Cer. Soc., 1953, pp. 272–276.

Devries, "Lowering of Curie Temperature of $BaTiO_3$ by Chemical Reduction," J. Am. Cer. Soc., vol. 43 (1960), p. 226, TP785A62.

Johnson et al., J. Am. Cer. Soc., vol. 32, (1949), pp. 398–401.

Johnson et al., "Influence of Impurities on Electrical Conductivity of Rutile," J. Am. Cer. Soc., vol. 36 (1953), pp. 97–101.

Pulvari: "Effect of Impurities on Electrical Solid-State Properties of Barium Titanate," J. Am. Cer. Soc., vol. 42 (1959), pp. 355–363.

HELEN M. McCARTHY, Primary Examiner

U.S. Cl. X.R.

23—51; 106—39; 252—63; 264—65, 66